US009146369B2

(12) United States Patent
Kolvek et al.

(10) Patent No.: US 9,146,369 B2
(45) Date of Patent: Sep. 29, 2015

(54) SYSTEM FOR CROSS-AXIS MANAGEMENT OF CONVENTIONAL AND FIBER OPTIC CABLES

(75) Inventors: Edward M. Kolvek, Merrimac, MA (US); Dennis P. Bowler, Sudbury, MA (US); Barry Lavoie, Lowell, MA (US); Gerard A. Esposito, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 282 days.

(21) Appl. No.: 13/606,158

(22) Filed: Sep. 7, 2012

(65) Prior Publication Data
US 2013/0064518 A1 Mar. 14, 2013

Related U.S. Application Data

(60) Provisional application No. 61/532,691, filed on Sep. 9, 2011.

(51) Int. Cl.
*G02B 6/32* (2006.01)
*G02B 6/44* (2006.01)
(52) U.S. Cl.
CPC ........................................ *G02B 6/44* (2013.01)

(58) Field of Classification Search
CPC .. G02B 6/4452; G02B 6/4471; G02B 6/4455; G02B 6/3897
USPC .......................................................... 385/135
See application file for complete search history.

(56) References Cited

U.S. PATENT DOCUMENTS

| 6,511,334 | B1 * | 1/2003 | Duden et al. ................... 439/164 |
| 7,466,890 | B2 * | 12/2008 | Kachmar ........................ 385/134 |
| 7,602,134 | B1 * | 10/2009 | Taylor et al. ................... 318/648 |
| 8,534,959 | B2 * | 9/2013 | Thompson et al. ............ 405/209 |
| 2004/0008157 | A1 * | 1/2004 | Brubaker et al. ................ 345/8 |
| 2010/0220390 | A1 * | 9/2010 | Wein et al. ..................... 359/429 |

* cited by examiner

*Primary Examiner* — Ryan Lepisto
*Assistant Examiner* — Mary El Shammaa
(74) *Attorney, Agent, or Firm* — Daniel J. Long

(57) ABSTRACT

A cross axis cable management system comprising a bird cage mechanism, a clock spring mechanism and a rolling loop mechanism positioned about a first axis, second axis and third axis of a gimbal mechanism respectively. Each mechanism provides defined channels and protective elements to prevent cable damage. The mechanisms also have one fixed end, one rotational end, and an optimized amount of slack for repeatable cable motion. The system effectively manages a large number of conventional and fiber optic cables while minimizing the friction or drag associated with the motion about the multiple axes and preventing cable damage and the resultant loss of performance.

27 Claims, 6 Drawing Sheets

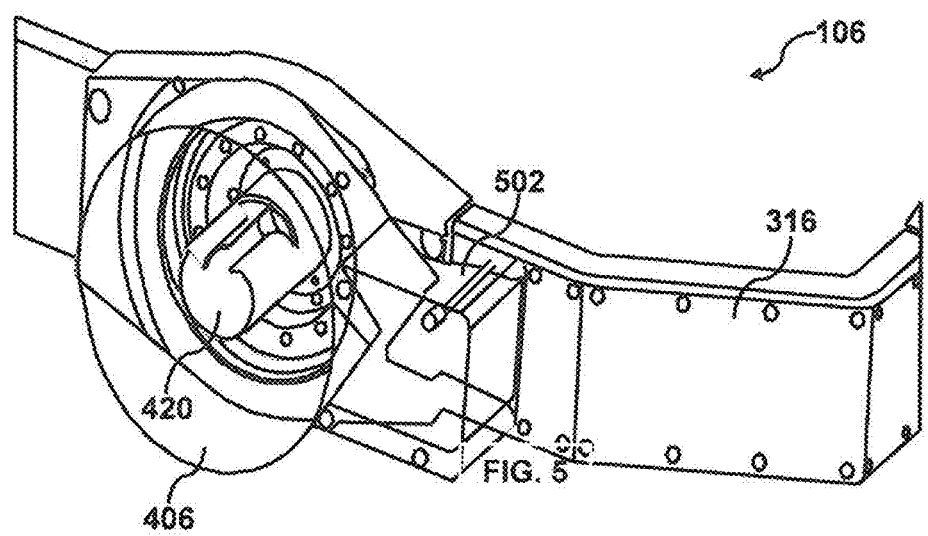

SYSTEM FOR CROSS-AXIS MANAGEMENT OF CONVENTIONAL AND FIBER OPTIC CABLES

CROSS-REFERENCE TO RELATED APPLICATIONS

This Application claims rights under 35 USC §119(e) from U.S. Application Ser. No. 61/532,691 filed Sep. 9, 2011 the contents of which are incorporated herein by reference.

TECHNICAL FIELD

Embodiments are generally related to cable management system. Embodiments are also related to system and method for managing cross-axis cables. Embodiments are additionally related to management of conventional and fiber optic ribbon cables in gimbal mechanism.

BACKGROUND OF THE INVENTION

Modern optical sensors and other electronic devices are often mounted within gimbal mechanisms to achieve free movement in multiple axes, which is especially true for many military applications. However, modern electronic devices often require hundreds or even thousands of signals to function properly, and each of these cables must be arranged in a manner that allows repeated motion in each gimbal axis without cable damage.

Further complicating this arrangement, any cross-axis cable management system must be compatible with a high number of both conventional cables and more sensitive, fiber-optic ribbon cables. Finally, friction or drag must be minimized or the additional friction leads to increased torque requirements, necessitating larger, heavier, more powerful motors.

Traditional methods of managing cables across rotational axis include slip rings and twist capsules. Slip ring is a type of electrical swivel and enables rotational motion of the cable without physically twisting the cable.

Slip rings are subject to wear due to electrical arcing, and also from being in physical contact with the rotating surfaces. Also slip rings are not suitable for transmitting high speed data nor in combustible environments due to electrical arcing. A major limiting factor to the maximum transmission rate while transmitting high frequency signals through slip rings is distortion of the waveforms due to reflections from impendence discontinuities. Impedance discontinuities can occur throughout the slip ring wherever different forms of transmissions lines interconnect and have different surge impedances.

The loss of energy through slip rings increases with frequency due to a variety of effects, such as multiple reflections from impedance mismatches, circuit resonance, distributed inductance and capacitance, dielectric losses and skin effect. Hence usage of slip rings for cable management generally limited to conventional cables and not suitable for use with fiber optic cables.

Fiber optic cables require minimum bend radii to operate within required performance specifications. The minimum bend radius of a fiber optic cable depends upon a variety of factors, including the signal handled by the fiber optic cable, the style of the fiber optic cable, and equipment to which the fiber optic cable is connected. Specialized rotational joints for fiber optic cable management have been developed for use with a gimbal, but most such joints enable the use of only a single multi mode fiber, and none can manage the high number of single mode fibers or fiber ribbons required to operate modern high resolution imaging systems.

A need therefore exists for a cable management system capable of routing large numbers of conventional and fiber optic or fiber optic ribbon cables across multiple gimbal axes without loss of performance or cable damage.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for cable management systems.

It is another aspect of the disclosed embodiments to provide system and method for managing cross axis cables.

It is yet another aspect of the disclosed embodiments to provide management of conventional, fiber optic and fiber optic ribbon cables.

It is another aspect of the disclosed embodiments to provide cross axis cable management system for cables attached to gimbal mechanisms.

It is another aspect of the present invention to provide a cross axis cable management system which uses a "bird cage" mechanism, a "clock spring" mechanism, and a "rolling loop" mechanism to effectively manage a large number of conventional and fiber optic ribbon cables.

It is yet another aspect of the disclosed embodiments to provide for components which includes defined channels and protective elements to prevent cable damage.

The aforementioned aspects and other objectives and advantages can now be achieved as described herein. A cross axis cable management system comprises a "bird cage" mechanism in the first axis, a "clock spring" mechanism in the second axis, and a "rolling loop" mechanism in the third axis to effectively manage a large number of conventional and fiber optic ribbon cables. Each of the mechanisms comprises one fixed end, one rotational end and an optimized amount of slack for repeatable cable motion. The bird cage orients the cables parallel to the first axis and rotates about the first axis with the gimbal system such that the cables are twisted relative to the fixed end of the bird cage. Cables are then routed into a clock spring mechanism positioned about the second axis wherein the inner end of the spiral rotates about the second axis with the gimbal system. Finally, the cables are routed to a rolling loop mechanism wherein the inner end of the loop rotates about the third axis with the gimbal mechanism The present invention effectively manages a large number of conventional and fiber optic ribbon cables while minimizing the friction or drag associated with the motion about multiple axis and preventing cable damage and the resultant loss of performance. Also the present invention is capable of routing large numbers of conventional, fiber optic and fiber optic ribbon cables across multiple gimbal axes without loss of performance or cable damage.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

FIG. 5 illustrates an internal isometric view of the clock spring mechanism depicted in FIG. 4 showing the clock spring cable carriers removed for clarity, in accordance with the disclosed embodiments; and FIG. 6A

DETAILED DESCRIPTION

The particular values and configurations discussed in these non-limiting examples can be varied and are cited merely to illustrate at least one embodiment and are not intended to limit the scope thereof.

Figure 1:
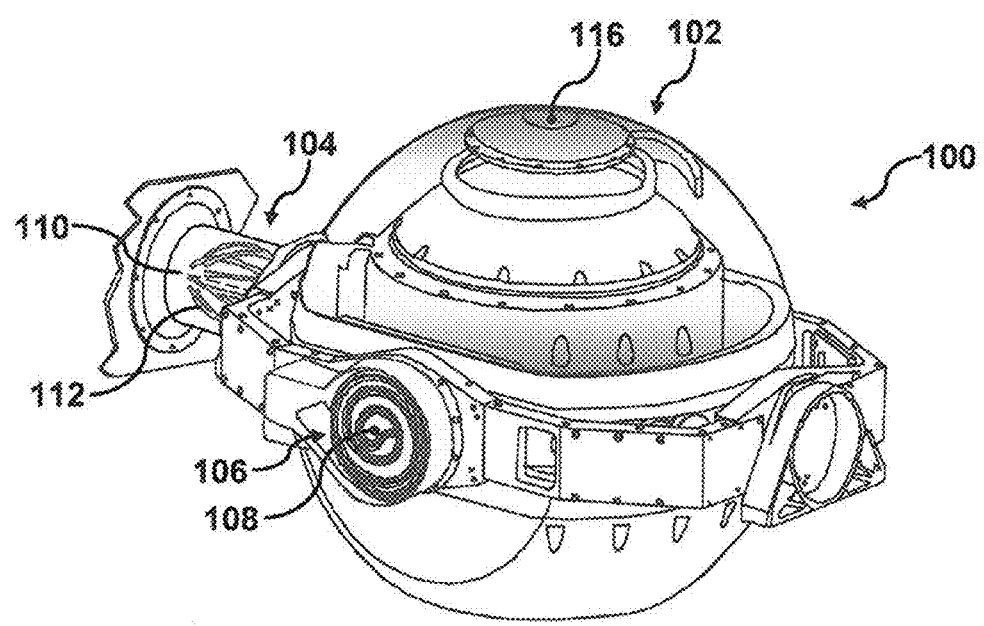
FIG. 1 illustrates an isometric view of a cross-axis cable management system showing a bird cage, a clock spring, and a rolling loop mechanisms, in accordance with the disclosed embodiments.

Referring to FIG. 1, an isometric view of a cross-axis cable management system 100 is shown. The system 100 uses a "bird cage" mechanism 104 in the first axis 110, a "clock spring" mechanism 106 in the second axis 108, and a "rolling loop" mechanism 102 in the third axis 116 to effectively manage a large number of conventional and fiber optic ribbon cables 112. The friction or drag and bend radius associated with the motion of the cables about the second axis 108, the third axis 116 and the first axis 110 is limited, thus preventing cable 112 damage and the resultant loss of performance. Each of the mechanisms 104, 106, 102 provides defined channels and protective elements to prevent cable 112 damage. Also the mechanisms 104, 106, 102 have one fixed end, one rotational end, and an optimized amount of slack for repeatable cable motion.

Figure 2:
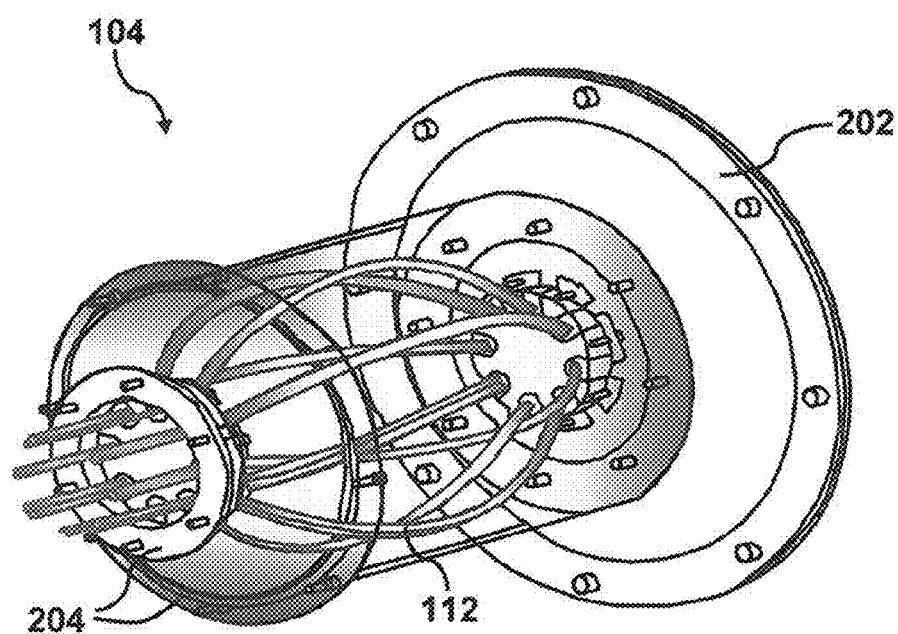
FIG. 2 illustrates an isometric view of the bird cage mechanism depicted in FIG. 1 showing the connection of cables to a pod interface and a gimbal interface, in accordance with the disclosed embodiments.
Figure 3:
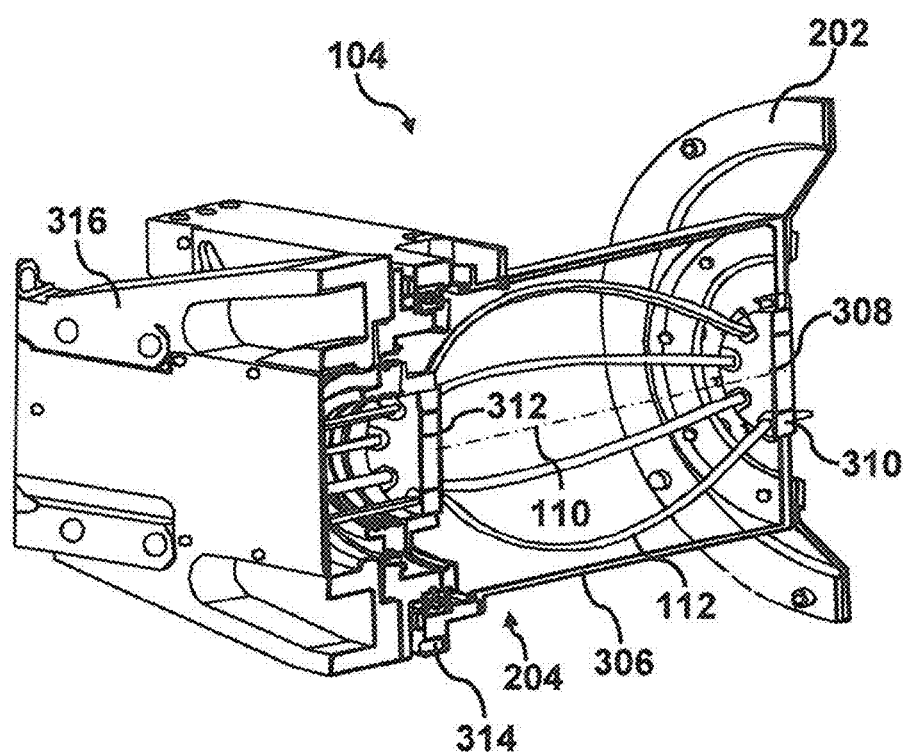
FIG. 3 illustrates an internal isometric view of the bird cage mechanism depicted in FIG. 2 showing mechanical arrangements provided for cabling, in accordance with the disclosed embodiments.

FIG. 2 illustrates an isometric view of the bird cage mechanism 104 depicted in FIG. 1, showing the connection of cables 112 to a pod interface 202 and a gimbal interface 204. An internal view of the bird cage mechanism 104 depicted in FIG. 2 is shown in FIG. 3. The bird cage mechanism 104 positions the cables 112 parallel to the roll axis 110 within a protective cover 306 which protects the cables 112. The bird cage mechanism 104 includes a fixed end 308 and a moveable end 312. The cables 112 at fixed end 308 are connected to the pod interface 202 by utilizing a cable constraint 310. The protective cover 306 at the fixed end 308 is attached to a pod interface 202 and the protective cover 306 at movable end 312 is attached to the gimbal through gimbal interface 204. The moveable end 312 rotates about the first axis 110 along with the gimbal through a roll axis bearings 314 such that cables 112 are twisted relative to the fixed end 308, thus providing optimized slackness for the cables 112. Interconnection of cables 112 from the first axis 110 to the second axis 108 is through a passage 316. The required travel of the cable 112 is of 230° from stop to stop with ±100° normal travel.

Figure 4:
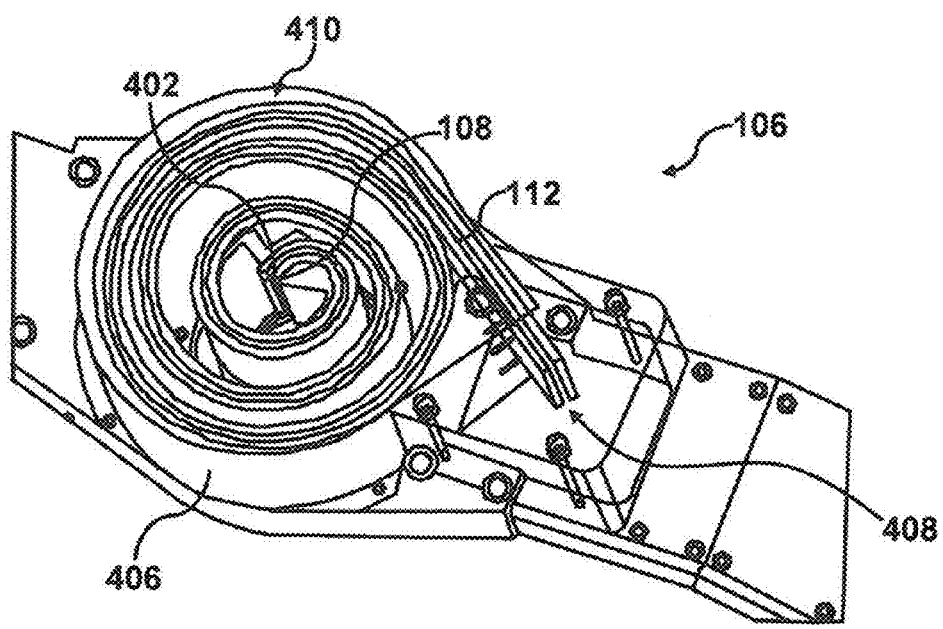
FIG. 4 illustrates an isometric view of the clock spring mechanism depicted in FIG. 1 showing cable management about a rotating axis, in accordance with the disclosed embodiments.

FIG. 4 illustrates an isometric view of the clock spring spiral cable carrier mechanism 106 depicted in FIG. 1. The clock spring spiral cable carrier mechanism 106 positions the cables 112 about the second axis 108 and within a protective cover 406. The cables 112 are damped and fixed at outer end 408 of the spiral cable carriers 410. The inner end 402 of the spiral cable carriers 410 rotates about the second axis 108 with the gimbal. The spiral cable carriers 410 are flexible, thus providing optimized slackness for the cables 112. Also cables 112 are not subjected to friction or drag due to motion of gimbal system, since clock spring carrier mechanism 106 allows free movement.

FIG. 5 illustrates an internal isometric view of the clock spring spiral cable carrier mechanism 106 depicted in FIG. 4 showing the clock spring cable carriers 410 removed for clarity. The cables 112 enter into the clock spring spiral cable carrier mechanism 106 through the passage 316 from the bird cage mechanism 104. The protective cover 406 protects the cables 112 from damage. The access cover 502 protects the cables 112 at the junction. The cables 112 connected to third axis 116 through a passage 420. The required travel of cable is of 130° from stop to stop with ±50° normal travel.

Figures 6A, 6B:
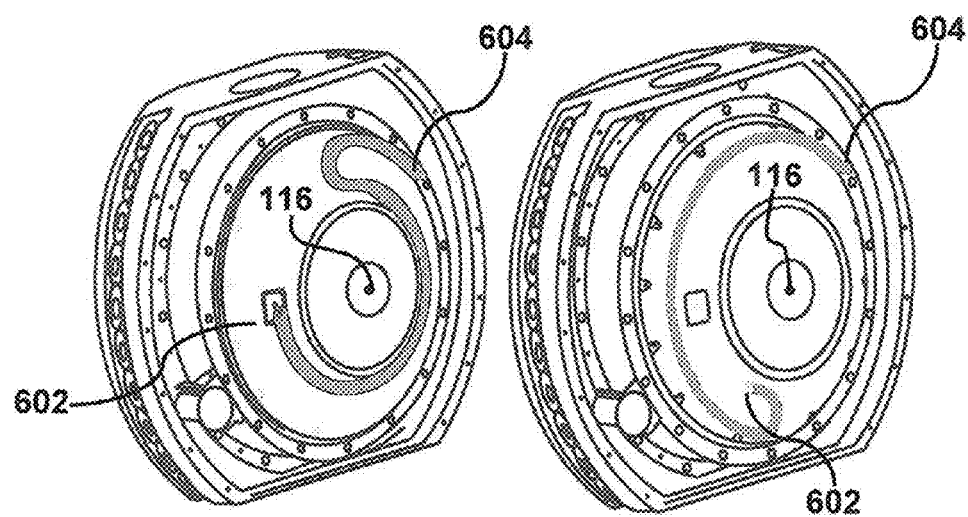
FIG. 6B illustrates an isometric view of the rolling loop mechanism depicted in FIG. 1 showing cable management about a rotating axis with clockwise limit and counter clockwise limit, in accordance with the disclosed embodiments.

FIG. 6A and FIG. 6B illustrates an isometric view of the rolling loop mechanism 102 depicted in FIG. 1 showing the cable management about the third axis 116 with clockwise limit and counter clockwise limit respectively. The cables 112 are routed to the rolling loop mechanism 102 wherein the cables 112 are fixed at the outer end 604 of the loop and the inner end 602 of the loop rotates about the third axis 116 with the gimbal mechanism. The segment of cable 112 comprising the rolling loop mechanism 102 will be positioned within a suitable cable carrier for example cable carrier of Energy Chain make. The required travel of cable is of 470° from stop to stop with ±195° normal travel.

While the present invention has been described in connection with a preferred embodiment, it is to be understood that other similar embodiments may be used or modifications and additions may be made to the described embodiment for performing the same function of the present invention without deviating there from. Therefore, the present invention should not be limited to any single embodiment.

What is claimed is:

1. A system for cross axis management of a plurality of conventional and fiber optic or fiber optic ribbon cables comprising:
    a torsional bird cage mechanism positioned about a first axis of a gimbal mechanism; and
    a spiral clock spring cable mechanism positioned about a second axis of said gimbal mechanism, wherein said cables are routed from said torsional bird cage mechanism to said spiral clock spring mechanism.

2. A system for cross axis management of a plurality of conventional and fiber optic or fiber optic ribbon cables comprising:
    a spiral clock spring mechanism positioned about a second axis of a gimbal mechanism; and
    a rolling loop cable mechanism positioned about a third axis of said gimbal mechanism, wherein said cables are routed from said spiral clock spring mechanism to said rolling loop cable mechanism.

3. A system for cross axis management of a plurality of conventional and fiber optic or fiber optic ribbon cables comprising:

a rolling loop cable mechanism positioned about a third axis of a gimbal mechanism; and a torsional bird cage mechanism positioned about a first axis of the gimbal mechanism, wherein said cables are routed from said rolling loop cable mechanism to said torsional bird cage mechanism.

4. A system for cross axis management of a plurality of conventional and fiber optic or fiber optic ribbon cables comprising:

a torsional bird cage cable mechanism positioned about a first axis of a gimbal mechanism;

a spiral clock spring cable mechanism positioned about a second axis of said gimbal mechanism; and a rolling loop cable mechanism positioned about a third axis of said gimbal mechanism, wherein said cables are routed through said torsional bird cage cable mechanism to said spiral clock spring cable mechanism and then routed to said rolling loop cable mechanism.

5. The system of claim 1, wherein the first axis is a roll axis, the second axis is a pitch axis, and the third axis is a yaw axis.

6. The system of claim 1, wherein said torsional bird cage cable mechanism comprises said cables routed by utilizing at least one torsional bird cage cable router.

7. The system of claim 6, wherein said torsional bird cage cable router orients said cables parallel to said roll axis and rotates about said roll axis with said gimbal mechanism.

8. The system of claim 6, wherein said torsional bird cage cable router comprises a fixed end, a rotational end and an optimized amount of slack for repeatable motion.

9. The system of claim 8, wherein said cables are twisted relative to said fixed end of said torsional bird cage cable router.

10. The system of claim 8, wherein said spiral clock spring cable mechanism comprises said cables routed by utilizing a flexible spiral clock spring fixed at an outer end and movable at an inner end.

11. The system of claim 8, wherein said cables are clamped and fixed at said outer end of the said flexible spiral clock spring and said inner end of the said flexible spiral clock spring rotates about said pitch axis with said gimbal mechanism.

12. The system of claim 8, wherein said rolling loop cable mechanism comprises a rolling loop, a cable carrier and said cables.

13. The system of claim 8, wherein said cables are fixed at an outer end of said rolling loop and an inner end of said loop rotates about said yaw axis with said gimbal mechanism.

14. The system of claim 8, wherein a segment of said cables with said rolling loop are positioned within said cable carrier.

15. The system of claim 8, wherein said torsional bird cage cable mechanism, said spiral clock spring cable mechanism, and said rolling loop cable mechanism comprises at least one cover for protecting said cables.

16. A method for managing a cross axis of a plurality of conventional and fiber optic or fiber optic ribbon cables comprising:

positioning a torsional bird cage cable mechanism about a first axis of a gimbal mechanism;

positioning a spiral clock spring cable mechanism about a second axis of said gimbal mechanism;

positioning a rolling loop cable mechanism about a third axis of said gimbal mechanism; and routing said cables through said torsional bird cage cable mechanism to said spiral clock spring cable mechanism and then routed to said rolling loop cable mechanism.

17. The method of claim 16 wherein the first axis is a roll axis, the second axis is a pitch axis and the third axis is a yaw axis.

18. The method of claim 16, further comprising protecting said cables by utilizing at least one protective cover.

19. The method of claim 16, wherein said cables in said torsional bird cage cable mechanism are routed by utilizing at least one torsional bird cage cable router.

20. The method of claim 19, wherein said torsional bird cage cable router orients said cables parallel to said roll axis and rotates about said roll axis with said gimbal mechanism.

21. The method of claim 19, wherein said torsional bird cage cable router comprises a fixed end, a rotational end and an optimized amount of slack for repeatable motion.

22. The method of claim 21, wherein said cables are twisted relative to said fixed end of said torsional bird cage cable router.

23. The method of claim 19, wherein said cables in said spiral clock spring cable mechanism are routed by utilizing a flexible spiral clock spring fixed at an outer end and movable at an inner end.

24. The method of claim 19, wherein said cables are clamped and fixed at said outer end of the said spiral clock spring and said inner end of the said spiral clock spring rotates about said pitch axis with said gimbal mechanism.

25. The method of claim 19, wherein said rolling loop cable mechanism comprises a rolling loop, a cable carrier and said cables.

26. The method of claim 19, wherein said cables are fixed at an outer end of said rolling loop and an inner end of said loop rotates about said yaw axis with said gimbal mechanism.

27. The method of claim 19, wherein a segment of said cable with said rolling loop are positioned within said cable carrier.

\* \* \* \* \*